United States Patent
Heyne et al.

(10) Patent No.: US 11,108,252 B2
(45) Date of Patent: Aug. 31, 2021

(54) CHARGING SEQUENCE CONTROL OF A POWER ELECTRONICS SYSTEM

(71) Applicant: Dr. Ing. h.c. F. Porsche Aktiengesellschaft, Stuttgart (DE)

(72) Inventors: Raoul Heyne, Wiernsheim (DE); Timo Kaul, Bietigheim-Bissingen (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 133 days.

(21) Appl. No.: 16/556,398

(22) Filed: Aug. 30, 2019

(65) Prior Publication Data
US 2020/0076210 A1 Mar. 5, 2020

(30) Foreign Application Priority Data
Sep. 3, 2018 (DE) .......................... 102018121404.9

(51) Int. Cl.
| | |
|---|---|
| *H02J 7/00* | (2006.01) |
| *B60L 53/18* | (2019.01) |
| *G07F 15/00* | (2006.01) |
| *B60L 53/30* | (2019.01) |

(52) U.S. Cl.
CPC ............ *H02J 7/0027* (2013.01); *B60L 53/18* (2019.02); *B60L 53/305* (2019.02); *G07F 15/005* (2013.01); *H02J 7/0042* (2013.01)

(58) Field of Classification Search
CPC .............................. H02J 7/0027; B60L 53/305
USPC ........................................................ 320/107
See application file for complete search history.

(56) References Cited

U.S. PATENT DOCUMENTS

| | | | |
|---|---|---|---|
| 8,766,595 B2 | 7/2014 | Gaul et al. | |
| 8,829,858 B2 | 9/2014 | Ransom et al. | |
| 10,259,336 B2 | 4/2019 | McQuillen et al. | |
| 2015/0042277 A1 | 2/2015 | Tang et al. | |
| 2015/0278038 A1* | 10/2015 | Halker | B60L 53/126 714/3 |
| 2017/0322248 A1* | 11/2017 | Miret | G01R 31/005 |
| 2018/0236888 A1* | 8/2018 | Yabuuchi | H02J 7/0031 |
| 2019/0109462 A1* | 4/2019 | Gotz | H02J 7/00047 |
| 2019/0315244 A1* | 10/2019 | Bartz | H02J 50/10 |

(Continued)

FOREIGN PATENT DOCUMENTS

| | | |
|---|---|---|
| DE | 102009036816 A1 | 2/2011 |
| DE | 102012204675 A1 | 12/2012 |

(Continued)

*Primary Examiner* — Suchin Parihar
(74) *Attorney, Agent, or Firm* — RatnerPrestia

(57) ABSTRACT

A method for charging sequence control of a power electronics system, in which a charging power is provided by the power electronics system, in which a charging unit, which is operated by a user and which transfers the charging power to a battery, is controlled by a charging control system. A communication exchange is carried out at least between a control device of the power electronics system and the charging control system, in which a plurality of charging process states are predetermined, in which sequences between the charging process states are stored in a program sequence plan and in which the program sequence plan is used for charging sequence control of the power electronics system. For the event of a fault the charging process states "Not ready to charge" and "Fault in charging process" are predetermined.

12 Claims, 1 Drawing Sheet

(56) References Cited

U.S. PATENT DOCUMENTS

| | | | | |
|---|---|---|---|---|
| 2020/0092379 A1* | 3/2020 | Leege | ............... | H04L 67/141 |
| 2020/0094703 A1* | 3/2020 | Ohtomo | ............... | B60L 53/67 |
| 2020/0101850 A1* | 4/2020 | Harty | ............... | B60L 58/13 |
| 2020/0254882 A1* | 8/2020 | Kwon | ............... | B60L 53/16 |

FOREIGN PATENT DOCUMENTS

| | | |
|---|---|---|
| DE | 102011113355 A1 | 3/2013 |
| DE | 102017124054 A1 | 4/2018 |

* cited by examiner

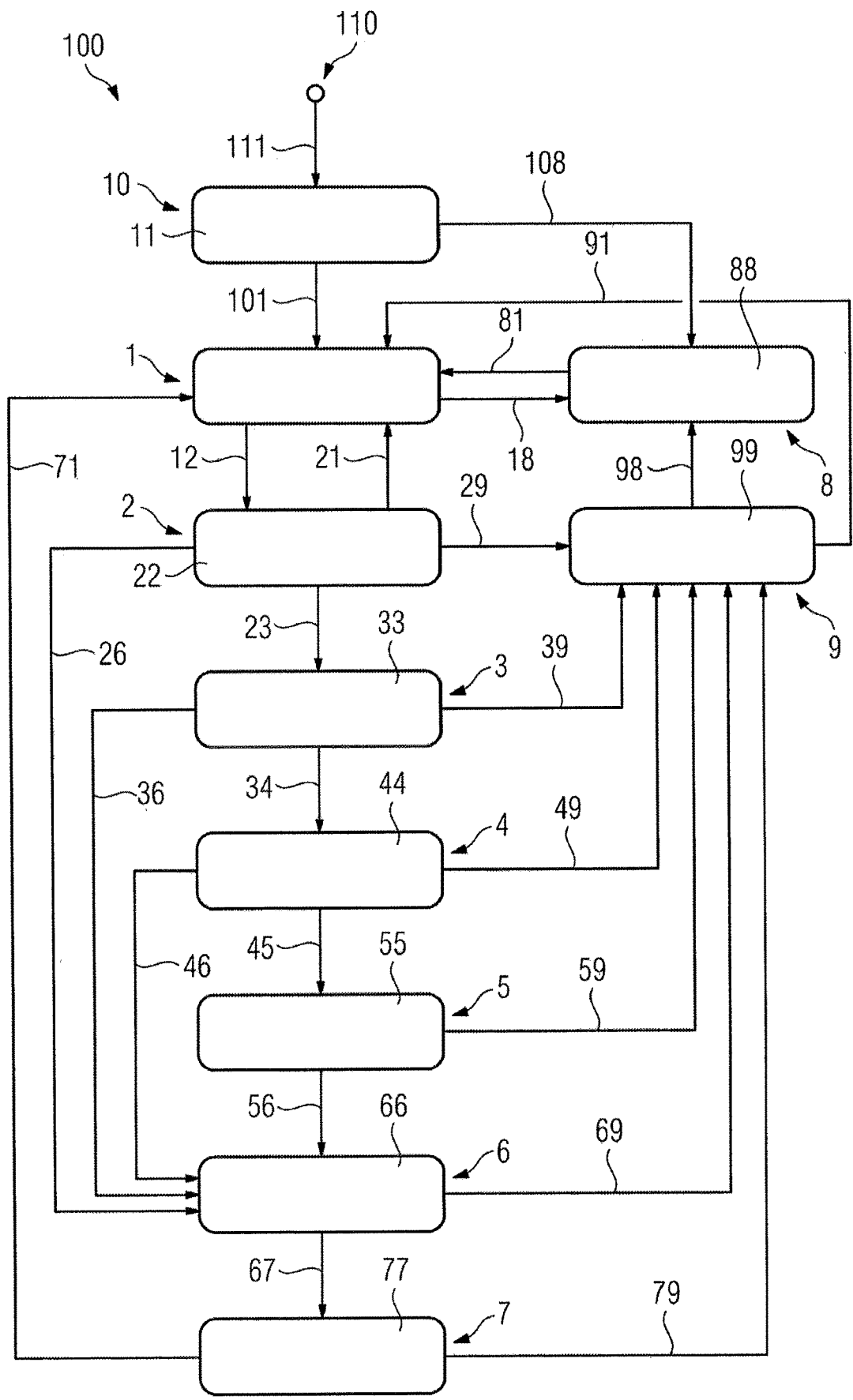

CHARGING SEQUENCE CONTROL OF A POWER ELECTRONICS SYSTEM

CROSS REFERENCE TO RELATED APPLICATIONS

This application claims priority to German Patent Application No. 10 2018 121 404.9, filed Sep. 3, 2018, the content of such application being incorporated by reference herein in its entirety.

FIELD OF THE INVENTION

The present invention relates to a method for charging sequence control of a power electronics system, which method relates to charging electric vehicles in a charging park. A system, which contains the charging sequence controller of the power electronics system, is also claimed.

BACKGROUND OF THE INVENTION

Charging parks are provided for charging or rapidly charging an electric vehicle using high direct-current voltages or direct currents. Said charging parks may have a plurality of charging units, for example charging columns or charging stations, and comprise a plurality of components such as, for example, a cooling unit, also referred to as a CoolingBox, and/or a power electronics system effecting the high direct-current voltages or direct currents, designed either as a standalone module—also referred to as an LEM—with a power electronics control device, or integrated into what is known as a ChargeBox—also referred to as a CBX—with a ChargeBox controller as control device. With most charging parks installed today, it must be assumed that the various components are restricted to the charging columns or charging stations. Although the components can be managed by a single main control device owing to said physical unit within a respective charging column, communication of a plurality of components present in a charging station is also conceivable. The latter is described in document DE 10 2011 113 355 A1, which is incorporated by reference herein, in which state information of the components of the charging station is exchanged with a central computer.

In contrast, if the components are physically distributed, communication between the respective components or the control devices thereof is essential. In this case, it may also be necessary to conduct communication between a respective charging station and a central management system for example with respect to a charging power to be provided. In this respect, document DE 10 2009 036 816 A1, which is incorporated by reference herein, discloses a method and an apparatus for controlling charging stations for electric vehicles, which is intended to minimize peak load demands by a plurality of electric vehicles charging at the same time. To this end, a plurality of charging stations are preferably combined to form a group and a charging power to be respectively yielded per group is estimated by communication with the respective groups by means of a central computer.

The charging stations in use worldwide are now provided with different components that communicate with one another, wherein the communication must be coordinated accordingly. Furthermore, the components must implement the charging sequences in a manner outwardly conforming to standards. To this end, industrial standards DIN EN 61851 and DIN SPEC 70121 describe the charging sequence at a level of powerline communication, also referred to by PLC, in a manner quite accurate in detail. However, it is conceivable to stipulate simpler communication between the individual components.

SUMMARY OF THE INVENTION

Described herein is a method, which ensures simple communication in the case of physically distributed components, in particular with a power electronics system located outside of the charging unit. To this end, meaningful states should be developed, which make possible a clear and reliable transition through a charging sequence. Programming effort for charging sequence control in this regard should in this case be designed as simply as possible so that the charging sequence results in a simple sequence protocol containing all the essential features. Furthermore, the charging sequence should take into account all the various charging standards. Also described herein is a correspondingly designed power electronics system.

A method for charging sequence control of a power electronics system is proposed, in which a charging power is provided by the power electronics system, in which a charging unit, which is operated by a user and which transfers the charging power to a battery, is controlled by a charging control system or a charging control device, in which a communication exchange is carried out at least between a control device of the power electronics system and the charging control system, in which a plurality of charging process states are predetermined, in which sequences between the charging process states are stored in a program sequence plan and in which the program sequence plan is used for charging sequence control of the power electronics system, wherein, proceeding from a switch-on process, the charging process states "Initialization", "Ready to charge", "Initialization of charging interface", "Insulation measurement", "Precharging", "Charging", "End charging process", "Charging process terminated", and for the event of a fault the charging process states "Not ready to charge" and "Fault in charging process" are predetermined, wherein the respective charging process state is supplied with or coupled to at least one respective task and/or is formed by at least one respective piece of state information, wherein the communication exchange with the charging control system is formed by at least one of the pieces of state information, wherein, if no fault arises, a change is made to a respective next charging process state, possibly after a time delay, as soon as a respective task is ended and/or a change is triggered by communication exchange with the charging control system, and wherein, if a fault arises, a change is made to the charging process states "Fault in the charging process" or "Not ready to charge" and a change is made to the charging process state "Ready to charge" after the fault has been eliminated.

In one embodiment of the method according to aspects of the invention, the control device of the power electronics system is formed by a power electronics control device. The power electronics system including power electronics control device may form within a charging park a separate module, which is referred to as LEM by a person skilled in the art.

In another embodiment of the method according to aspects of the invention, the control device of the power electronics system is formed by a ChargeBox controller. In this case, for providing the charging power, a ChargeBox has inter alia the power electronics system and, as control device, the ChargeBox controller.

In one embodiment of the method according to aspects of the invention, the power electronics system, including control device, and the charging control system are arranged in a physically separated manner. If necessary, the power electronics system, in which heat develops during operation, is supplied with a cooling unit and arranged at an appropriate distance from the charging unit in which the charging control system is installed in order to not negatively impact a user of the charging unit by the noisy cooling unit.

In the context of the present disclosure, communication exchange means transmission of respective messages or signals between the power electronics system or the control device of the power electronics system and a further component and/or a control device of the charging park or electric vehicle, in particular the charging control system or the charging control device.

In yet another embodiment of the method according to aspects of the invention, the communication exchange is performed by means of Ethernet and/or powerline communication and/or WLAN and/or LAN and/or CAN bus and/or mobile radio. Said communication means are intended to illustrate only an exemplary selection and do not restrict other possible forms of the communication exchange. For example, it is conceivable that the communication exchange between the charging control system and the power electronics system takes place via a fixedly installed transmission cable, for example Ethernet within a LAN, but communication with an electric vehicle to be charged is done via mobile radio.

In the following text, a possible program sequence plan of charging sequence control on a control device of the power electronics system is described. The control device of the power electronics system carries out communication exchange at least with the charging control system. By way of example, the power electronics control device is used as the control device of the power electronics system; the program sequence plan is thus described on the basis of a power electronics module, referred tows LEM as mentioned above. In the same way, the program sequence plan is also conceivable with the ChargeBox controller of a ChargeBox instead of the power electronics control device of an LEM. The transition through the charging process states is effected in such a way that the respective charging process state is supplied with or coupled to at least one task, for example to the task of initialization, and/or forms a piece of state information, for example "I (respective addressed component) am ready to charge" or, with respect to the above task, "I (respective addressed component) have finished initialization". If the state information has been formed, communication exchange with the charging control system takes place thereby. Except in the case of a fault arising or in the case of the charging process being interrupted, for example by the user of the charging unit, a change is only made to the next charging process state provided in the program sequence plan when this is demanded by the charging control system through communication exchange with the charging control system.

The program sequence plan begins in a switched-off state of the LEM and is passed through with the switching on thereof, for example by way of a user-side action. Said program sequence plan then initially has the charging process state "Initialization". If a fault arises, a change is made to the charging process state "Not ready to charge". The fault may be based on, for example, incomplete initialization, another internal system fault arisen in the LEM or an external system fault communicated to the LEM, for example a fault of the charging unit. If no fault arises, the charging process state "Initialization" is considered to be terminated. To this end, communication exchange with the charging control system of the charging unit, which has confirmed or prescribed the charging process state "Initialization", may also be necessary.

After fault-free termination of the charging process state "Initialization", the charging process state "Ready to charge" follows in the program sequence plan. If a fault arises, which may be internal as well as external in nature, a change is made to the charging process state "Not ready to charge". As soon as the readiness to charge is considered to be present there, possibly after communication exchange with the charging control system, the assumption of the charging process state "Ready to charge" results again. If no fault arises and if the charging process state "Ready to charge" is confirmed through communication exchange possibly by the charging control system, which stipulates establishment of a connection between an electric vehicle and a charging plug of the charging unit, the next charging process state "Initialization of charging interface" is assumed in the program sequence plan.

In the charging process state "Initialization of charging interface", a selection of a predetermined charging system and of charging parameters of the electric vehicle is transmitted from the charging control system through communication exchange to the LEM. If in the meantime the charging plug should be disconnected from the electric vehicle, a change is made back to the previous charging process state "Ready to charge". If otherwise a fault should be identified, a transition is made to the charging process state "Fault in charging process". If, however, no fault arises and if the charging control system demands through communication exchange an insulation measurement of the power electronics system, the charging process state "Insulation measurement" results. Otherwise, a change can be made to the charging process state "End charging process" from the charging process state "Initialization of charging interface" when the charging process is ended prematurely, for example through interruption by the user at the charging station.

With changing to the charging process state "Insulation measurement", in the LEM an insulation measurement of the power electronics system, and depending on the charging standard also an insulation measurement of the charging cable, is demanded and the result of this insulation measurement is awaited. If a fault arises during the insulation measurement, a change is made to the charging process state "Fault in charging process". If no fault arises and the LEM sends a positive result, the next charging process state "Precharging" follows, provided that this is also demanded by the charging control system. Otherwise, a change can also be made to the charging process state "End charging process" from the charging process state "Insulation measurement" when the charging process is ended prematurely.

In the charging process state "Precharging", a charging cable, the power electronics system and possibly capacitances located on the electric vehicle are precharged. If a fault arises, a change is made to the charging process state "Fault in charging process". However, if the precharging is carried out and the charging parameters prescribed by the electric vehicle are confirmed by the LEM, for example by adjusting a charging voltage, the next charging process state "Charging" follows as long as the start thereof is also demanded by the charging control system. Otherwise, a change can also be made to the charging process state "End charging process" from the charging process state "Precharging" when the charging process is ended prematurely.

In the charging process state "Charging", a battery of the electric vehicle is charged by way of a charging power according to the charging system selection. The charging parameters of the electric vehicle are constantly exchanged through communication exchange between the electric vehicle, the charging control system and the LEM. If a fault arises, a change is made to the charging process state "Fault in charging process". However, if no fault arises, the battery is charged up to full charge and, when the charging control system demands the end of the charging process, a change is made to the charging process state "End charging process", or a change is made thereto anyway when the charging process is ended prematurely.

In the charging process state "End charging process", an absence of current and voltage is established at an output of the power electronics system by the LEM and all DC voltage contactors are opened. If a fault arises, a change is made to the charging process state "Fault in charging process". If no fault arises and if the absence of current and voltage is confirmed by the LEM and if the DC voltage contactors are open, a change is made to the charging process state "Charging process terminated".

The charging process state "Charging process terminated" is an additional safety state in which the absence of current and voltage and the opening of the DC voltage contactors is intended to be confirmed again in order that a charging plug ultimately connected to the LEM is definitely disconnected upon removal from the electric vehicle. In this charging to process state, it is possible to identify sticking or fusing of the contactors of the vehicle. To this end, a voltage measurement is carried out upstream of the open contactors in the direction of the charging column and the result is transmitted to the electric vehicle by means of the charging control system. If a fault arises, a change is made to the charging process state "Fault in charging process". If no fault arises and if the absence of current and voltage has been established, a change is made to the charging process state "Ready to charge" as soon as this has been demanded by the charging control system.

The charging process state "Fault in charging process" is reached when a fault from the respective charging process states "Initialization of charging interface", "Insulation measurement", "Precharging", "Charging", "End charging process" and "Charging process terminated" arises. If the fault can be eliminated and is no longer present or the electric vehicle is no longer connected to the charging unit, a change is made to the charging process state "Ready to charge". However, if the fault cannot be eliminated, a change is made to the charging process state "Not ready to charge".

Finally, a change can be made to the charging process state "Ready to charge" from the charging process state "Not ready to charge" only when the readiness to charge has been re-established, for example, through elimination of the fault.

In one embodiment of the method according to aspects of the invention, a rapid charging process is carried out, the high charging power of which is provided either by way of a high direct-current voltage and/or a high direct-current.

A system for charging sequence control of a power electronics system is also claimed, which system has the power electronics system, a control device for the power electronics system and a charging unit, which comprises a charging control system, and wherein the system is configured, in order to charge a battery that is to be connected to the charging unit, for example of an electric vehicle, to carry out an embodiment of the method according to aspects of the invention. A plurality of systems according to aspects of the invention can form what is known as a charging park. It is advantageous to divide the system according to aspects of the invention into individual components, which are possibly arranged physically distributed, since as a result a narrow charging column with only a low visual obstruction in traffic is possible for example as charging unit.

In one refinement of the system according to aspects of the invention, the system additionally comprises a power electronics control device. The power electronics control device and the power electronics system can form a separate module, referred to as LEM by a person skilled in the art, within a charging park and can be arranged at a distance from the charging column that is to be operated by the user.

In another refinement of the system according to aspects of the invention, the system additionally comprises a ChargeBox controller. The ChargeBox controller controls amongst other things the power electronics system within a ChargeBox. In the case of the ChargeBox, the charging column can also be placed up to 100 m away and thus be brought toward the parking vehicles.

The system is designed together with the program sequence plan according to aspects of the invention to ensure compatibility with charging standards known to a person skilled in the art, such as ChaDeMo, GB/T or CCS, for example.

BRIEF DESCRIPTION OF THE DRAWING

Further advantages and configurations of the invention emerge from the description and from the appended drawing.

The FIGURE shows a program sequence plan corresponding to one embodiment of the method according to aspects of the invention.

It is self-evident that the features mentioned above and the features yet to be discussed below may be used not only in the respectively specified combination but also in other combinations or individually without departing from the scope of the present invention.

DETAILED DESCRIPTION OF THE INVENTION

The FIGURE shows a program sequence plan 100 corresponding to one embodiment of the method according to aspects of the invention. A power electronics control device is selected as a control device of a power electronics system, said control device communicating with a charging control system. However, the same program sequence would also be conceivable with a ChargeBox controller. Furthermore, in the embodiment of the method according to aspects of the invention shown, the charging control system can communicate with a charging plug control device, which controls a charging plug, which is located at the end of a charging cable connected to a charging unit and is plugged into a corresponding charging socket on the electric vehicle during a charging process of a battery comprised by an electric vehicle. The power electronics system and the power electronics control device are arranged in a power electronics module, abbreviated to LEM. The program sequence plan 100 begins in a switched-off state 110 of the LEM and, with switch-on 111, which is triggered, for example, by a specific action of a user, such as, for example, by plugging the charging plug into a charging socket of an electric vehicle to be charged or by removing the charging plug from the charging column or by touching a charging column display, transitions to a charging process state "Initialization" 10, in which initialization 11 takes place. If a fault arises, which may be based, for example, on incomplete initialization, another internal system fault arisen in the LEM or an external system fault communicated to the LEM, a change 108 is made to a charging process state "Not ready to charge" 8. If no fault arises, the charging process state "Initialization" 10 is considered to be terminated. To this end, a communication exchange with the charging control system of the charging unit, which has confirmed or demanded the charging process state "Initialization" 10, may also be necessary. After fault-free termination of the charging process state "Initialization" 10, a charging process state "Ready to charge" 1 follows in the program sequence plan. If a fault arises in this charging process state, which may be internal as well as external in nature, a change 18 is made to the charging process state "Not ready to charge" 8. As soon as a readiness to charge 88 is considered to be present there, possibly after communication exchange with the charging control system, a change 81 is made again to the charging process state "Ready to charge" 1. If no fault arises and if the charging process state "Ready to charge" 1 is confirmed through communication exchange possibly by the charging control system, which stipulates establishment of a connection between an electric vehicle and a charging plug of the charging unit, a change 12 is made to a charging process state "Initialization of charging interface" 2 in the program sequence plan. In the charging process state "Initialization of charging interface" 2, a selection from predetermined options of a charging system and of charging parameters of the electric vehicle is transmitted from the charging control system through communication exchange 22 to the LEM. If in the meantime the charging plug should be disconnected from the electric vehicle, a change 21 is made back to the previous charging process state "Ready to charge" 1. If otherwise a fault should be identified, a change 29 is made to the charging process state "Fault in charging process" 9. If, however, no fault arises and if the charging control system demands, possibly prompted by the electric vehicle, through communication exchange an insulation measurement 33 of the power electronics system, a change 23 to a charging process state "Insulation measurement" 3 results. Otherwise, a change 26 can be made to a charging process state "End charging process" 6 from the charging process state "Initialization of charging interface" 2 when the charging process is ended prematurely, for example through interruption by the user at the charging station. If a fault arises during the insulation measurement 33, a change 39 is made to a charging process state "Fault in charging process" 9. If no fault arises and the LEM sends a positive result, a change 34 is made to a charging process state "Precharging" 4, provided that this is also demanded by the charging control system through communication exchange with the LEM, wherein it may also be that this has been demanded previously by a control device of the electric vehicle during charging control. Otherwise, a change 36 is made from the charging process state "Insulation measurement" 3 to the charging process state "End charging process" 6 when the charging process is ended prematurely. In the charging process state "Precharging" 4, possibly a charging cable and possibly capacitances located on the electric vehicle and possibly the power electronics system are precharged, wherein it may also be that this is performed by the electric vehicle itself. If a fault arises, a change 49 is made to the charging process state "Fault in charging process" 9. However, if the precharging 44 is carried out and the charging parameters prescribed by the electric vehicle are confirmed by the LEM, for example by adjusting a charging voltage, a change 45 is made to a charging process state "Charging" 5, provided that the start thereof is also demanded by the charging control system through communication exchange with the LEM, wherein it may also be in this case that this has been demanded previously by a control device of the electric vehicle during charging control. Otherwise, a change 46 can also be made to the charging process state "End charging process" 6 from the charging process state "Precharging" 4 when the charging process is ended prematurely. In a charging process state "Charging" 5, the battery of the electric vehicle is charged by way of a charging power corresponding to the charging system selection and the charging parameters of the electric vehicle. The charging parameters of the electric vehicle are constantly exchanged through communication exchange 55 between the electric vehicle, charging control system and LEM, in particular between the electric vehicle and the charging control system and between the charging control system and the LEM. If a fault arises, a change 59 is made to the charging process state "Fault in charging process" 9. However, if no fault arises, the battery is charged up to full charge and, when the electric vehicle and/or the charging control system demands the end of the charging process, a change 56 is made to a charging process state "End charging process" 6, or a change is made thereto anyway when the charging process is ended prematurely. In the charging process state "End charging process" 6, an absence of current and voltage at an output of the power electronics system is established and the associated DC voltage contactors are opened as an action 66 of the LEM. If a fault arises, a change 69 is made to the charging process state "Fault in charging process" 9. If no fault arises and if the absence of current and voltage is confirmed by the LEM and if the DC voltage contactors are open, a change 67 is made to a charging process state "Charging process terminated" 7. The charging process state "Charging process terminated" 7 is an additional safety state 77 in which the absence of current and voltage and the opening of the DC voltage contactors is intended to be confirmed again by the power electronics control device in order that the charging plug ultimately connected to the LEM through electrical feedthrough is definitely switched to current-free or voltage-free upon removal from the electric vehicle. Furthermore, in said charging process state, sticking of the contactors of the electric vehicle can be checked. If a fault arises, a change 79 is made to the charging process state "Fault in charging process" 9. If no fault arises and if the absence of current and voltage has been established, a change 71 is made to the charging process state "Ready to charge" 1, which can be demanded by the charging control system or takes place automatically. The charging process state "Fault in charging process" 9 is reached when a fault from the respective charging process states "Initialization of charging interface" 2, "Insulation measurement" 3, "Precharging" 4, "Charging" 5, "End charging process" 6 and "Charging process terminated" 7 arises. If the fault is eliminated 99 or the fault is no longer present or the fault has been caused by the electric vehicle and the electric vehicle is no longer connected to the charging unit, a change 91 is made to the charging process state "Ready to charge" 1. However, if the fault cannot be eliminated, a change 98 is made to the charging process state "Not ready to charge" 8. Finally, a change 81 can be made to the charging process state "Ready to charge" from the charging process state "Not ready to charge" 8 only when the readiness to charge has been re-established, for example, through elimination of the fault 88.

What is claimed is:

1. A method for charging sequence control of a power electronics system, in which a charging power is provided by the power electronics system, the method comprising:
   controlling a charging unit, which is operated by a user and which transfers the charging power to a battery, using a charging control system,
   carrying out a communication exchange at least between a control device of the power electronics system and the charging control system, in which a plurality of charging process states are predetermined, in which sequences between the charging process states are stored in a program sequence plan, and in which the program sequence plan is used for charging sequence control of the power electronics system,
   proceeding from a switch-on process, predetermining the charging process states "Initialization," "Ready to charge," "Initialization of charging interface," "Insulation measurement," "Precharging," "Charging," "End charging process," "Charging process terminated," and for the event of a fault the charging process states "Not ready to charge" and "Fault in charging process,"
   wherein the respective charging process state is supplied with at least one respective task and/or is formed by at least one respective piece of state information coupled to the respective charging process state,
   forming the communication exchange with the charging control system by at least one of the pieces of state information,
   wherein, if no fault arises, a change is made to a respective next charging process state as soon as a respective task is ended and/or a change is triggered by communication exchange with the charging control system, and
   wherein, if a fault arises, a change is made to the charging process states "Fault in the charging process" or "Not ready to charge" and a change is made to the charging process state "Ready to charge" after the fault has been eliminated.

2. The method as claimed in claim 1, in which the control device of the power electronics system is formed by a power electronics control device.

3. The method as claimed in claim 1, in which the control device of the power electronics system is formed by a ChargeBox controller.

4. The method as claimed in claim 1, in which the power electronics system, including control device, and the charging control system are arranged in a physically separated manner.

5. The method as claimed in claim 1, in which the communication exchange is performed by Ethernet and/or powerline communication and/or WLAN and/or LAN and/or CAN bus and/or mobile radio.

6. The method as claimed in claim 1, further comprising performing a rapid charging process, a high charging power of which is provided either by a high direct-voltage or a high direct current.

7. A system for charging sequence control of the power electronics system, comprising:
   the power electronics system,
   the control device for the power electronics system and the charging unit, which comprises the charging control system,
   wherein the system is configured, in order to charge the battery of an electric vehicle, to carry out the method as claimed in claim 1 by way of charging sequence control on the respective control device for the power electronics system and the charging control system.

8. The system as claimed in claim 7, in which the control device for the power electronics system is a power electronics control device.

9. The system as claimed in claim 7, in which the control device for the power electronics system is a ChargeBox controller.

10. The system as claimed in claim 7, further comprising a CoolingBox, a charging plug on the charging station, a charging plug control device and an electric vehicle fitted with the battery.

11. The method as claimed in claim 1, wherein if the fault arises during the "Initialization" state, the change is made to the charging process state "Not ready to charge".

12. The method as claimed in claim 1, when the change is made to the charging process state "Fault in the charging process,"
   a change is made to the charging process state "Not ready to charge" if the fault cannot be eliminated within predetermined parameters, and
   a change is made to the charging process state "Ready to charge" only after a readiness to charge has been re-established.

* * * * *